J. W. PEDEN.
AUTOMOBILE FOOTREST.
APPLICATION FILED FEB. 15, 1919.

1,316,180.

Patented Sept. 16, 1919.
2 SHEETS—SHEET 1.

Inventor
Joseph W. Peden
By Moulton & Livrance
Attorneys

J. W. PEDEN.
AUTOMOBILE FOOTREST.
APPLICATION FILED FEB. 15, 1919.
1,316,180.
Patented Sept. 16, 1919.
2 SHEETS—SHEET 2.
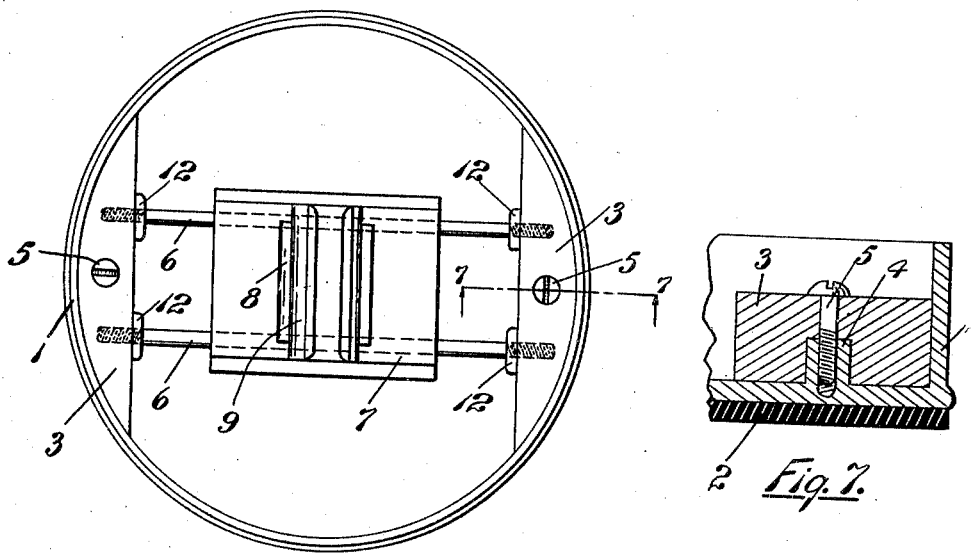
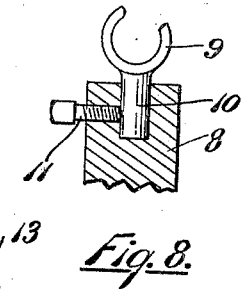
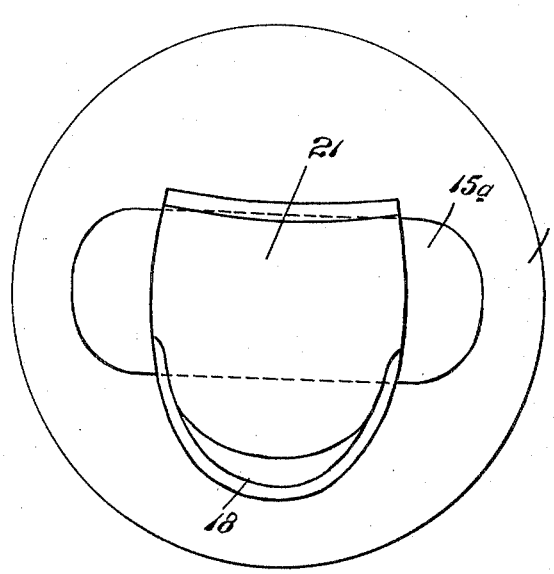
Inventor
Joseph W. Peden
By Moulton & Linnans
Attorneys

UNITED STATES PATENT OFFICE.

JOSEPH W. PEDEN, OF GRAND RAPIDS, MICHIGAN.

AUTOMOBILE-FOOTREST.

1,316,180.   Specification of Letters Patent.   Patented Sept. 16, 1919.

Application filed February 15, 1919. Serial No. 277,321.

*To all whom it may concern:*

Be it known that I, JOSEPH W. PEDEN, a citizen of the United States of America, residing at Grand Rapids, in the county of Kent and State of Michigan, have invented certain new and useful Improvements in Automobile-Footrests; and I do hereby declare the following to be a full, clear, and exact description of the invention, such as will enable others skilled in the art to which it appertains to make and use the same.

This invention relates to an automobile foot rest, and particularly one for use by the driver of the automobile. It is an object and purpose of the invention to construct a novel foot rest which is readily and easily adjustable and movable so that the driver, while his foot is held in the foot rest, does not need to give thought thereto, the rest freely moving, within limits, to any position needed for the operation of various foot operated controls for the automobile this making for freedom of action in controlling the automobile and releasing the driver from strain or cramped position incident to rigid foot rests. Furthermore, this foot rest serves as a protection for the mat usually present in the driving compartment of an automobile, and at the same time the construction of the foot rest is such that it need not be permanently secured in place but may be changed for different drivers, yet remain practically in any place it is put until designedly moved. A further object and purpose of the invention is to construct the foot rest in an economical manner, of few readily manufactured and assembled parts, so as to keep the cost at the lowest point. These features as well as many others not specifically enumerated at this point will appear fully and in detail as the description of the invention progresses, reference being had to the accompanying drawings, in which, Figure 1 is a side elevation of the foot rest.

Fig. 6 is a plan of the foot rest, the pivotally mounted heel receiving member and the cover of the device being removed to disclose the interior mechanism.

Fig. 7 is a fragmentary enlarged section on the line 7—7, of Fig. 6.

Fig. 8 is a fragmentary section and end elevation of the support for the heel receiving member, showing a slight modification in construction, and Fig. 9 is a plan view of the device modified for a different range of movement of the heel receiving member.

Like reference characters refer to like parts in the different views of the drawings.

Figure 1:
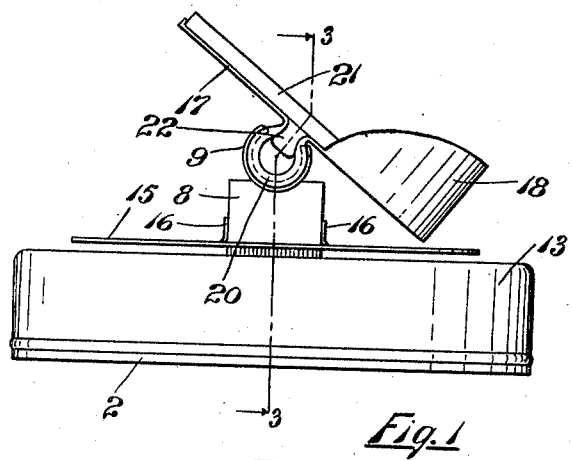

In construction a shallow pan-like member 1 is provided and is preferably cast from metal, to the under side of which a rubber mat 2 is secured. The sides of the member 1 are of cylindrical form as shown, though the form may be readily changed and modified without departing from the invention. Within said member and at opposed sides segments 3 are located into the under sides of which projections 4, preferably square in cross section, and case integral with the member 1, are inserted, the segments being secured in place by screws 5 passing downwardly therethrough and threading into said projections. Rods 6 placed in parallel and spaced apart relation are disposed between and connected at their ends to said segments, any suitable form of connection being used.

Figure 3:
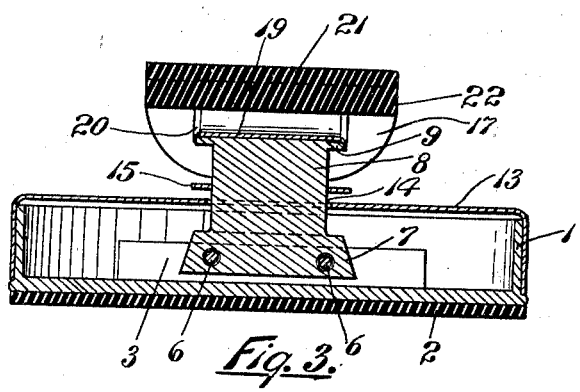
Fig. 3 is a section on the line 3—3, of Fig. 1.

A block 7 is slidably mounted on the rods which pass therethrough one adjacent each side of the block. A post 8 extends upwardly from the block and may be made integral therewith, being provided at its upper end with a curved socket 9 which may be formed integral with the post 8 as shown in Figs. 1 and 3, or formed at the upper end of a rod 10 which may be inserted into the post 8 and held in fixed position by a set screw as shown in the modification in Fig. 8. A bumper 12 of rubber or like material is placed around each rod 6 at each end against which the ends of the block 7 strike when moved far enough in either direction.

The member 1 is covered by a cover 13 having a slot 14 in its top through which the post 8 projects. This slot is long enough to permit the movement of the block 7 back and forth on rods 6 within the limits prescribed by the segments 3 and to cover the slot and stop the entrance of dust and the like a plate 15 is attached to post 8 in position to lie over the slot 14. The attachment is made by striking lips 16 upwardly to form the opening through which the post 8 passes, said lips bearing frictionally against opposite sides of the post, and it is evident that the plate 15 may be located very closely adjacent the cover 13, being spaced therefrom only sufficiently to allow its free movement over the cover.

The socket member 9 is adapted to have a heel rest plate 17 of sheet metal pivotally mounted thereon, said plate at its rear portion being formed with an upturned section 18, as shown, and at or about its middle with a downwardly pressed loop 19 which is adapted to loosely fit within the socket of the socket member 9, inserting endwise therein after which the ends of the loop are flared outwardly as indicated at 20, this permanently connecting the plate 17 to the member 9 but allowing pivotal movement of the plate about the pivotal axis lengthwise of the socket member. A rubber pad 21 is located against the upper side of the plate 17, it being formed on its underside with a transverse rib 22 which may be inserted lengthwise into an end of the loop 19, the same being narrower at its opening than below such opening and the rib correspondingly shaped so that when attached upward movement of the pad with respect to the plate 17 is stopped, while the upturned section 18 precludes lateral movement of the pad and a detachment thereof. In attaching the pad, its rear end may be bent upwardly sufficient to pass over the section 18 and on release of the pad it comes within said section 18 stopping and holding the same from accidental displacement.

Figure 2:
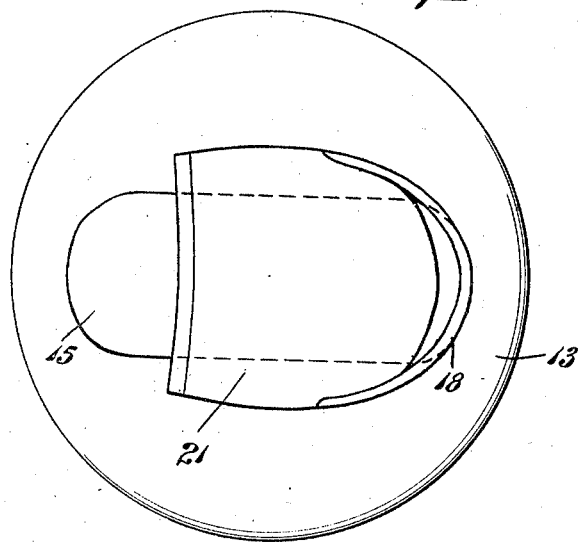
Fig. 2 is a plan view thereof.
Figure 4:
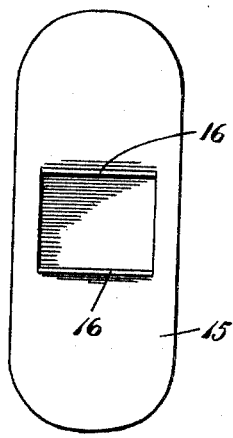
Fig. 4 is a plan of the dust protecting plate forming an element of the construction.
Figure 5:
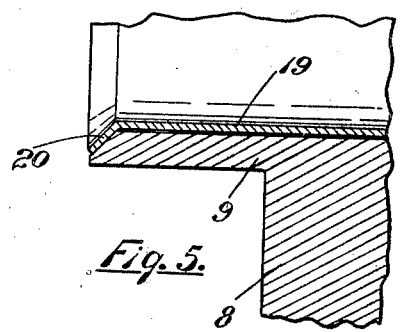
Fig. 5 is a fragmentary enlarged sectional view for illustrating the connection of the heel rest proper to the rest of the construction.

This construction is particularly useful in connection with the foot operated controls of an automobile, the heel of the driver being received in front of the curved section 18 and resting on the pad 21. The weight of the device coupled with the rubber bottom 2 which rests on the usual rubber mat in the front compartment of an automobile serves to hold it against movement while the pivotal mount of the heel receiving member and the movable mount of the block 7 permits the necessary range of adjustment and movement of the foot of the operator, and this without strain on the operator, as the movements follow naturally with any movement of the foot, practically no force being necessary to operate the parts of the structure. The operator may work the accelerator pedal, or any other pedal at will. It may be desirable to have a movement of the heel rest at right angles to that shown in Fig. 1, and this is readily accomplished by placing the plate 15ᵃ at right angles to the position indicated in Figs. 1 and 2, the slot 14 being similarly located as well as the block 7 and its mount, as shown in Fig. 9. If two of the foot operated controls lie side by side and closely together, this structure may be preferred, and with the connection of the socket member 9 to the post 8 as shown in Fig. 8, it is merely necessary to turn the rod 10 through a quarter circle to get either adaptation illustrated in Figs. 2 and 9. It is also obvious that the movably mounted mechanism may be readily duplicated on a single support for additional range of operation of the controls if necessary.

This construction is simple, readily manufactured and assembled and is of value not only for protecting the usual mat in the driving compartment of an automobile, but as an aid to the driver in operating the various controls in a more satisfactory manner. There are many changes in minor detail of construction which may be resorted to without departing from the invention, and I consider myself entitled to all such modifications as come within the scope of the claims defining the invention.

I claim:

1. In combination, a support, a member slidably mounted on the support, means limiting the extent of movement of said member, and a heel rest pivotally mounted on said member at the upper portion of the same, substantially as described.

2. In combination, a support, a member slidably mounted on the support, said member having an upwardly projecting post, means to limit the extent of sliding movement of said member, a socket member at the upper end of the post, and a heel rest having a part loosely received in the socket member to pivotally connect the heel rest to the said member and permit said heel rest to turn about a horizontal axis, substantially as described.

3. In combination, a support, two rods mounted on the support in spaced apart and parallel relation to each other, a member slidably mounted on the rods, means to limit the extent of slidable movement on said rods, and a heel rest pivotally mounted on the member at the upper portion thereof and mounted to turn about a substantially horizontal axis, substantially as described.

4. In combination, a support, two rods mounted on the support in spaced apart and parallel relation to each other, a block slidably mounted on the rods and having a post extending vertically therefrom, stop members at the ends of the rods limiting the extent of sliding movement of the block, and a heel rest pivotally mounted to turn about a horizontal axis at the upper end of the post, substantially as described.

5. In combination, a pan-like support, rods positioned horizontally therein and in parallel and spaced apart relation a distance above the bottom of the support, a block through which said rods pass loosely, said block being slidably mounted on the rods, a cover for the support having a slot therein paralleling the rods, a post on the block extending upwardly through said slot in the cover, a plate connected to the post and lying over the slot in the cover, and a heel rest pivotally mounted to turn about a horizontal axis at the upper end of the post, substantially as described.

6. In combination, a pan-like support, blocks disposed at opposite sides of the support and within the same, means for attaching said blocks to the support, two rods disposed between and connected at their ends to said blocks, being positioned in parallel and spaced apart relation, a member slidably mounted on the rods and having a post extending upwardly therefrom, a cover for the support through which said post passes, the cover being slotted to pass the post and permit sliding movements of the member, a plate through which the post passes located over said slot, means for frictionally connecting the plate to the post, and a heel rest pivotally mounted to turn about a horizontal axis at the upper end of the post, substantially as described.

7. In combination, a support, a member slidably mounted thereon, means to limit the sliding movements of said member, a post extending upwardly from the member, a curved socket member of cylindrical form at the upper end of the post, the axis thereof being substantially horizontal, and a heel rest including a metal plate formed with a depending loop adapted to enter the socket member longitudinally, said loop being flared outwardly at its ends after connection with the socket member to permanently connect the heel rest to said socket member, substantially as described.

8. In combination, a support, a post carried by the support, a cylindrical socket member open at its upper side and positioned horizontally at the upper end of the post, a heel rest comprising a metal plate formed between its ends with a downturned loop to enter the socket member longitudinally from one end thereof, the ends of the loop being flared after such connection to make a permanent attachment of the plate to the socket member, and a rubber pad placed on the plate and having a rib entered into said loop to hold the pad against disconnection from the plate, substantially as described.

In testimony whereof I affix my signature.

JOSEPH W. PEDEN.

Copies of this patent may be obtained for five cents each, by addressing the "Commissioner of Patents, Washington, D. C."